(12) United States Patent
Yang et al.

(10) Patent No.: US 12,726,114 B2
(45) Date of Patent: Sep. 1, 2026

(54) CONVERSION CONTROL CIRCUIT FOR ADJUSTING PFC OUTPUT VOLTAGE AND CONTROL METHOD THEREOF

(71) Applicant: Richtek Technology Corporation, Hsinchu (TW)

(72) Inventors: Ta-Yung Yang, Hsinchu (TW); Shih-Ho Hsu, Hsinchu (TW); Kun-Yu Lin, Hsinchu (TW); Hsin-Yi Wu, Hsinchu (TW); Tzu-Chen Lin, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 149 days.

(21) Appl. No.: 18/935,688

(22) Filed: Nov. 4, 2024

(65) Prior Publication Data

US 2025/0279717 A1 Sep. 4, 2025

Related U.S. Application Data

(60) Provisional application No. 63/559,879, filed on Mar. 1, 2024.

(30) Foreign Application Priority Data

Sep. 20, 2024 (TW) ................................ 113135871

(51) Int. Cl.
*H02M 1/42* (2007.01)
*H02M 1/00* (2006.01)
*H02M 3/00* (2006.01)

(52) U.S. Cl.
CPC ......... *H02M 1/4225* (2013.01); *H02M 1/007* (2021.05); *H02M 3/01* (2021.05)

(58) Field of Classification Search
CPC ....... H02M 1/4225; H02M 1/007; H02M 3/01
See application file for complete search history.

(56) References Cited

U.S. PATENT DOCUMENTS

2003/0099119 A1* 5/2003 Yamada .............. H02M 1/4225 363/21.12
2011/0085354 A1* 4/2011 Wang .................... H02M 1/007 363/21.02
2018/0198366 A1* 7/2018 Greetham ........... H02M 1/4225
2020/0266712 A1* 8/2020 Li ...................... H02M 3/33507
2025/0079977 A1* 3/2025 Liu ..................... H02M 1/0019

* cited by examiner

*Primary Examiner* — Harry R Behm
(74) *Attorney, Agent, or Firm* — Huan-Yi Lin

(57) ABSTRACT

A conversion control circuit controls a resonant power converter and a first output voltage generated by a power factor correction (PFC) circuit. The resonant power converter generates a second output voltage based on the first output voltage. The conversion control circuit includes: a first transconductance circuit for generating a first signal based on a proportional output voltage related to the second output voltage; a second transconductance circuit for generating a second signal based on an input-related signal, wherein the input-related signal is related to a peak value of an input voltage of the PFC circuit; and a current control circuit for generating a third signal based on the first signal and the second signal. The third signal is for rendering the first output voltage such that the first output voltage decreases as the second output voltage decreases and also decreases as the input voltage decreases.

23 Claims, 6 Drawing Sheets

CONVERSION CONTROL CIRCUIT FOR ADJUSTING PFC OUTPUT VOLTAGE AND CONTROL METHOD THEREOF

CROSS REFERENCE

The present invention claims priority to the provisional application, Ser. No. 63/559,879, filed on Mar. 1, 2024 and claims priority to the TW patent application Ser. No. 113135871, filed on Sep. 20, 2024.

BACKGROUND OF THE INVENTION

Field of Invention

The present invention relates to a conversion control circuit, particularly to a conversion control circuit configured for adjusting the output voltage of a power factor correction (PFC) circuit. The invention also relates to a control method configured for adjusting the output voltage of a PFC circuit.

Description of Related Art

FIG. 1A shows a schematic diagram of a power supply system in the prior art. As shown in FIG. 1A, the prior art power supply system 9000 includes a PFC circuit 900, a power converter 950, and a rectifier 92. The rectifier 92 rectifies an AC voltage to generate a rectified voltage VBD. The PFC circuit 900 is configured to convert the rectified voltage VBD to generate a power factor corrected output voltage PVO'. The PFC circuit 900 includes a correction control circuit 90 and a power stage circuit 91. The power stage circuit 91 is a boost converter, including a switch Swa, a diode Da, and an inductor La. The switch Swa is an N-type Metal-Oxide-Semiconductor (MOS) device. The correction control circuit 90 is configured to correct the power factor of the power supply system 9000. Specifically, the correction control circuit 90 generates a modulation signal PWM based on the rectified voltage VBD and a feedback voltage VF, thereby controlling the switching of the switch Swa to convert the rectified voltage VBD into the output voltage PVO'. The power converter 950 is configured to convert the power factor corrected output voltage PVO' to generate an output voltage VO'.

FIG. 1B shows a waveform diagram of the input voltage and output voltage in the prior art power supply system. As shown in FIG. 1B, after rectification by the rectifier 92, the waveform of the rectified voltage VBD is an in-phase sine wave above zero. The output voltage PVO' generated by the prior art PFC circuit conversion is typically a fixed value higher than the rectified voltage VBD.

The disadvantage of the aforementioned prior art is that the output voltage PVO' of the PFC circuit 900 is a fixed voltage and cannot be adjusted according to its input voltage (i.e., the rectified voltage VBD). Therefore, it results in poor efficiency of power factor correction, that is, the power factor of the PFC circuit 900 is relatively poor. On the other hand, since the output voltage PVO' of the PFC circuit 900 cannot be adjusted according to the output voltage VO' of the power converter 950, it leads to poor conversion efficiency of the power converter 950.

In view of the above circumstances, to overcome the shortcomings of the prior art, the present invention proposes a conversion control circuit for controlling a resonant power converter, which allows the output voltage of the PFC circuit to be adaptively adjusted according to the input voltage of the PFC circuit and the output voltage of the resonant power converter, and simultaneously not lower than the minimum operating voltage of the PFC circuit, nor lower than the minimum input voltage level convertible by the resonant power converter. This enables the PFC circuit to have a better power factor and simultaneously allows the resonant power converter to have better conversion efficiency.

SUMMARY OF THE INVENTION

From one perspective, the present invention provides a conversion control circuit, configured to control a resonant power converter and configured to adjust a first output voltage generated by a power factor correction (PFC) circuit, wherein the resonant power converter generates a second output voltage based on the first output voltage, the second output voltage being programmable, and the first output voltage being adaptively adjustable, the conversion control circuit comprising a first transconductance circuit configured to generate a first current signal based on a proportional output voltage related to the second output voltage; a second transconductance circuit configured to generate a second current signal based on an input-related signal, wherein the input-related signal is related to a peak value of an input voltage of the PFC circuit; and a current control circuit configured to generate a third current signal based on the first current signal and the second current signal; wherein the third current is positively signal correlated with the signal and negatively first current correlated with the second current signal; wherein the third current signal is configured to adjust the first output voltage such that when the second output voltage decreases, the first output voltage decreases accordingly, and when the input voltage decreases, the first output voltage also decreases.

In one preferred embodiment, the second current signal is configured to limit a maximum value of the third current signal, thereby increasing a lower limit of downward adjustment of the first output voltage when the input voltage of the PFC circuit increases.

In one preferred embodiment, the first transconductance circuit is further configured to generate the first current signal based on a first threshold and the proportional output voltage; wherein the second transconductance circuit is further configured to generate the second current signal based on a second threshold and the input-related signal.

In one preferred embodiment, when the proportional output voltage is less than the first threshold, the first current signal positively correlated with the proportional output voltage, thereby causing the first output voltage to decrease as the second output voltage decreases; and when the input-related signal is greater than the second threshold, the second current signal becomes positively correlated with the input-related signal, thereby increasing the lower limit of downward adjustment of the first output voltage based on the second current signal when the input-related signal increases.

In one preferred embodiment, the second threshold corresponds to a voltage level that enables the PFC circuit to operate at an optimal power factor.

In one preferred embodiment, only when the first output voltage is greater than or equal to a threshold voltage, be the PFC circuit able to operate, wherein the threshold voltage corresponding to the peak value of the input voltage plus a minimum boost value.

In one preferred embodiment, the second threshold is positively correlated with the threshold voltage, and a lower limit of the second threshold is related to the proportional output voltage, thereby ensuring the enabling of the PFC circuit and the resonant power converter when the first output voltage is adaptively adjusted with the input-related signal based on the second current signal.

In one preferred embodiment, the proportional output voltage is generated by sampling an auxiliary winding of a transformer of the resonant power converter.

In one preferred embodiment, the third current signal is coupled to a feedback voltage divider of the PFC circuit, thereby adjusting the first output voltage.

In one preferred embodiment, when the proportional output voltage is greater than or equal to the first threshold, adjusting the first output voltage based on the proportional output voltage ceases; or when the input-related signal is less than or equal to the second threshold, adjusting the first output voltage based on the input-related signal ceases.

In one preferred embodiment, the first transconductance circuit is configured as a first unidirectional voltage-to-current conversion circuit, including a first and a second buffer circuits, respectively configured to buffer the first threshold and the proportional output voltage; a first resistor, coupled between output terminals of the first and the second buffer circuits, to unidirectionally generate a first transconductance current when the proportional output voltage is less than the first threshold, wherein the first transconductance current is related to a difference between the first threshold and the proportional output voltage; and at least one first current mirror circuit, coupled to the first buffer circuit, configured to generate the first current signal based on the first transconductance current; and/or the second transconductance circuit is configured as a second unidirectional voltage-to-current conversion circuit, including a third and a fourth buffer circuits, respectively configured to buffer the input-related signal and the second threshold; a second resistor, coupled between output terminals of the third and the fourth buffer circuits, to unidirectionally generate a second transconductance current when the input-related signal is greater than the second threshold, the second transconductance current is related to a difference between the input-related signal and the second threshold; and at least one second current mirror circuit, coupled to the third buffer circuit, configured to generate the second current signal based on the second transconductance current.

In one preferred embodiment, the current control circuit includes a unidirectional conducting device, with its forward end configured to receive the first current signal and the second current signal, to unidirectionally generate the third current signal at its reverse end.

In one preferred embodiment, at least one of the first to the fourth buffer circuits corresponds to one of the following: the buffer circuit includes an operational amplifier configured with unit gain; or the buffer circuit includes a first and a second source followers cascaded with each other, wherein the first and the second source followers have opposite and similar level shifts.

From another perspective, the present invention provides a control method for controlling a resonant power converter and for adjusting a first output voltage generated by a power factor correction (PFC) circuit, wherein the resonant power converter generates a second output voltage based on the first output voltage, the second output voltage being programmable, and the first output voltage being adaptively adjustable, the control method comprising generating a first current signal based on a proportional output voltage related to the second output voltage; generating a second current signal based on an input-related signal, wherein the input-related signal is related to a peak value of an input voltage of the PFC circuit; generating a third current signal based on the first current signal and the second current signal; and adjusting the first output voltage based on the third current signal, such that when the second output voltage decreases, the first output voltage decreases accordingly, and when the input voltage decreases, the first output voltage also decreases; wherein the third current signal is positively correlated with the first current signal and negatively correlated with the second current signal.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
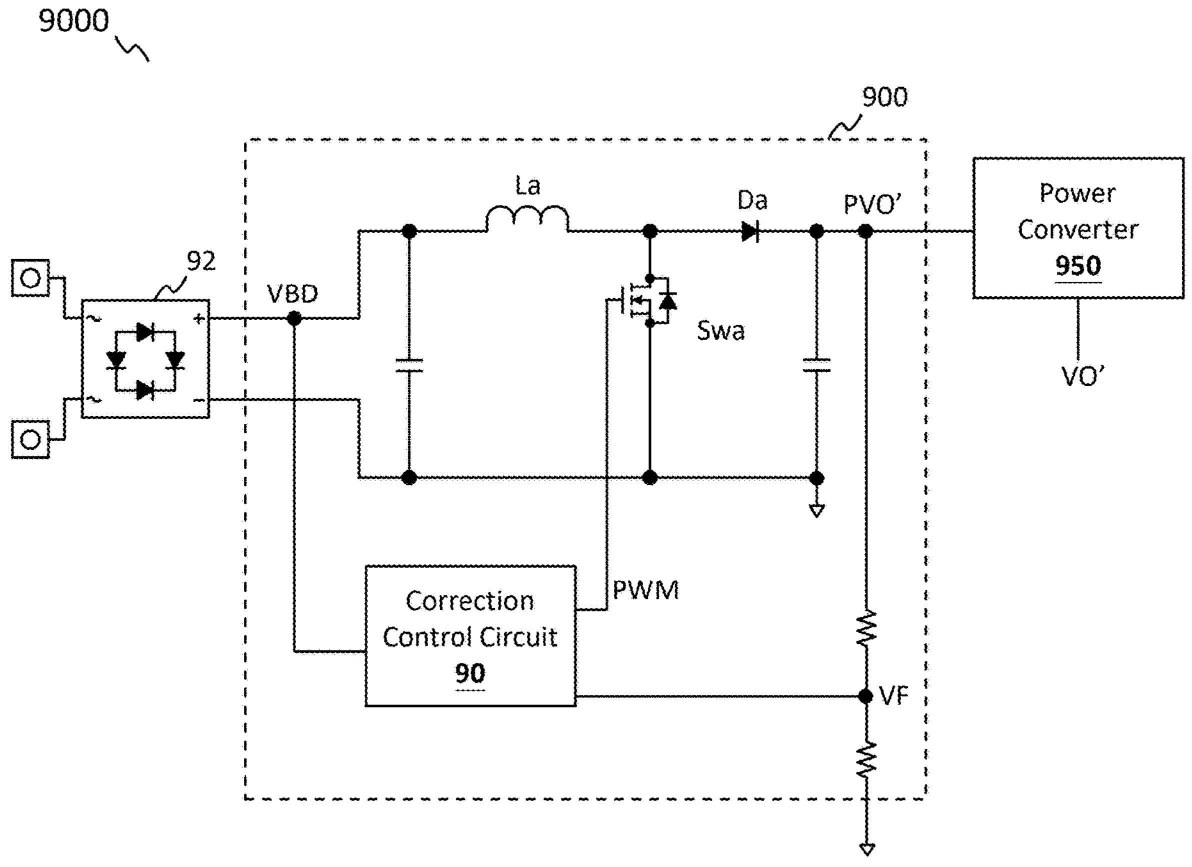
FIG. 1A shows a schematic diagram of a power supply system in the prior art.
Figure 1B:
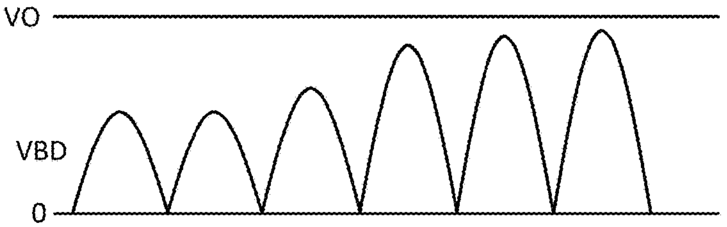
FIG. 1B shows a waveform diagram of the input voltage and output voltage in the prior art power supply system.
Figure 2:
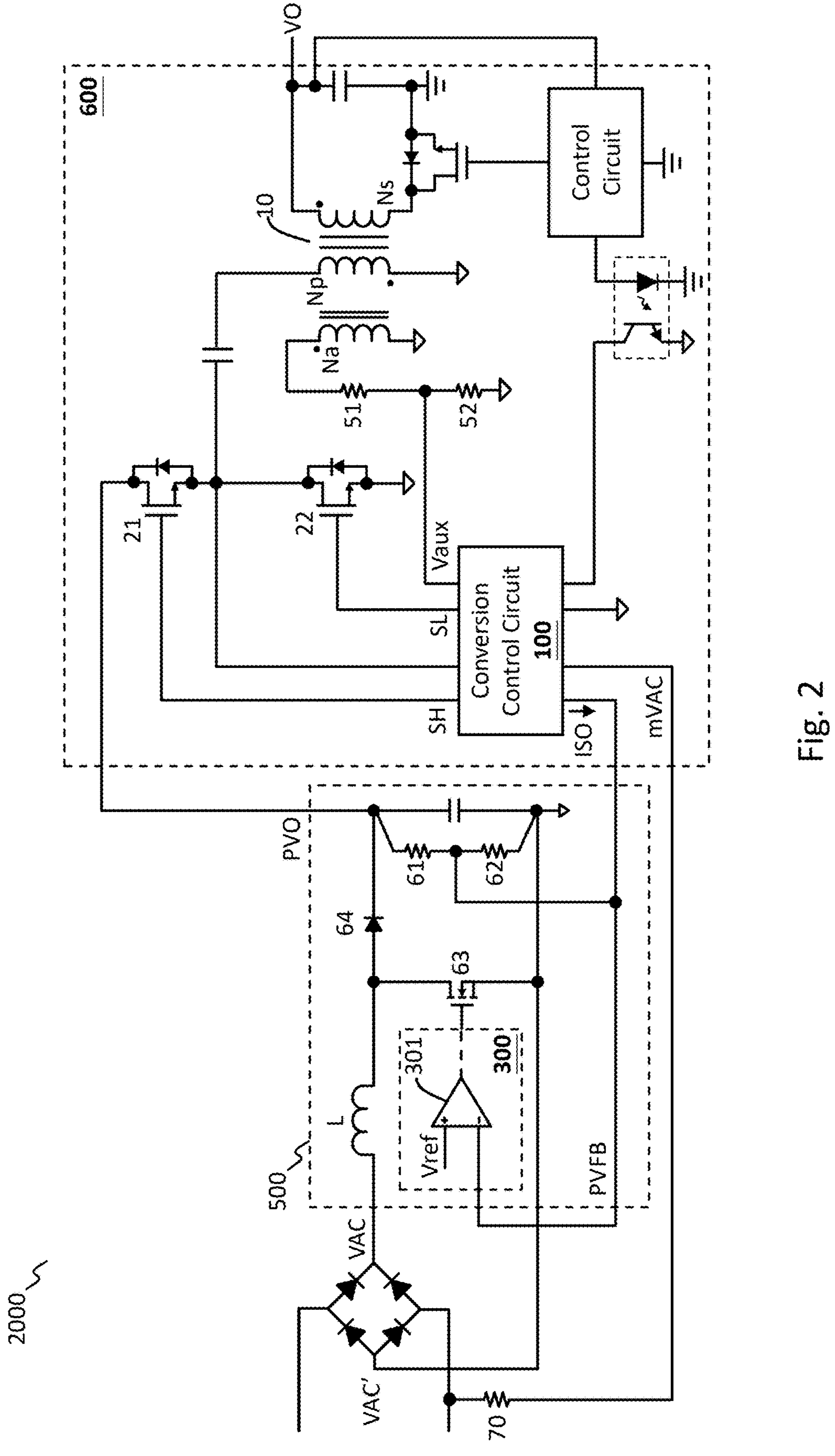
FIG. 2 shows a schematic diagram of a power supply system in an embodiment of the present invention.

FIG. 2 shows a schematic diagram of a power supply system in an embodiment of the present invention. As shown in FIG. 2, in one embodiment, the power supply system 2000 includes a power factor correction (PFC) circuit 500 and a resonant power converter 600. In one embodiment, the PFC circuit 500 is configured to convert an input voltage VAC to generate a first output voltage PVO. In one embodiment, the resonant power converter 600 includes a conversion control circuit 100 configured to generate control signals SH and SL for controlling the switching of transistors 21 and 22, respectively. Thereby controlling the resonant power converter 600 to convert the first output voltage PVO to generate a second output voltage VO. In one embodiment, the conversion control circuit 100 is coupled to an auxiliary winding Na of a transformer 10 via resistors 51 and 52 to sample a reflected voltage Vaux. The reflected voltage Vaux is related to the second output voltage VO of the resonant power converter 600. The second output voltage VO is related to the turn-ratio of a primary windings Np and a secondary winding Ns of the transformer 10, the input voltage of the transformer 10, and the duty cycle of the switching signal applied to the transformer 10. Additionally, the conversion control circuit 100 also senses a signal mVAC related to the input voltage VAC via resistor 70. In one embodiment, the input voltage VAC of the PFC circuit 500 is the voltage obtained after rectifying an AC voltage VAC'.

In one embodiment, the conversion control circuit 100 is also configured to generate a current signal ISO based on the second output voltage VO and the input voltage VAC, thereby adjusting the first output voltage PVO generated by the PFC circuit 500. It should be noted that, according to the present invention, the second output voltage VO is a programmable voltage, and the first output voltage PVO can be adaptively adjusted based on the input voltage VAC and the second output voltage VO. The details will be described in subsequent embodiments.

In one embodiment, the PFC circuit 500 includes a power stage circuit and a correction control circuit 300. The power stage circuit, for example, is a boost-type power stage circuit including an inductor L, a transistor 63, and a unidirectional conducting device 64. The correction control circuit 300 includes an error amplifier 301. The error amplifier 301 is configured to control the transistor 63 based on a feedback signal PVFB related to the first output voltage PVO and a reference voltage Vref.

Figure 3:
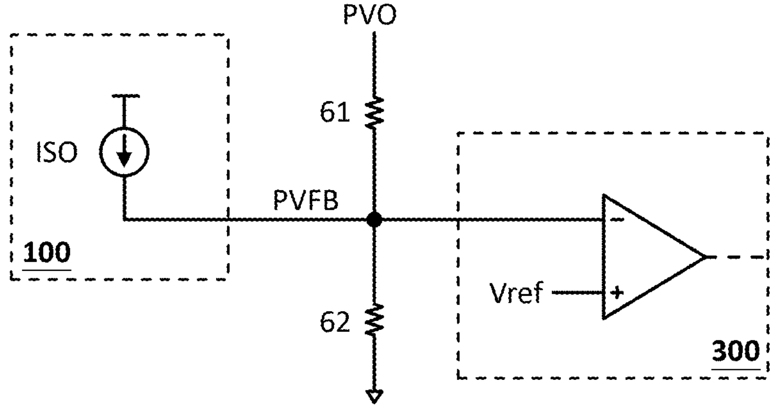
FIG. 3 shows a schematic diagram of part of the circuit of the power supply system in one embodiment of the present invention.

Please refer to FIGS. 2 and 3 simultaneously. FIG. 3 shows a schematic diagram of part of the circuit of the power supply system in one embodiment of the present invention. In one embodiment, resistors 61 and 62 in the PFC circuit 500 form a feedback voltage divider configured to determine the first output voltage PVO of the PFC circuit 500. In one embodiment, the current signal ISO generated by the conversion control circuit 100 is injected into the feedback voltage divider (i.e., resistors 61 and 62) of the PFC circuit 500, thereby adjusting the first output voltage PVO. The maximum voltage value of the first output voltage PVO is jointly determined by resistors 61 and 62 and the reference voltage Vref. When the current signal ISO flows through resistors 61 and 62, it causes the first output voltage PVO to decrease. The first output voltage PVO can be expressed by the following Equation (1):

$$PVO = [Vref - (ISO * R62)]/K0 \quad \text{(Eq. 1)}$$

In Equation (1), the constant K0 is equal to R62/(R61+R62), R61 and R62 are the resistance values of resistors 61 and 62, respectively, and R61 is much larger than R62. From FIG. 3 and Equation (1), it can be seen that the current signal ISO can be configured to adjust the first output voltage PVO of the PFC circuit 500.

Figure 4:
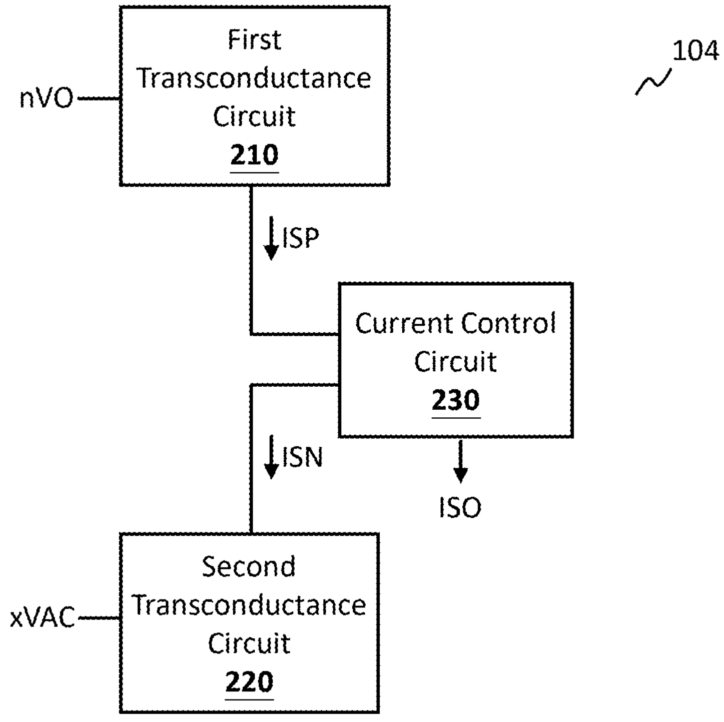
FIG. 4 shows a block diagram of the conversion control circuit in one embodiment of the present invention.

FIG. 4 shows a block diagram of the conversion control circuit in one embodiment of the present invention. In one embodiment, the conversion control circuit 104 includes a first transconductance circuit 210, a second transconductance circuit 220, and a current control circuit 230. In one embodiment, the first transconductance circuit 210 is configured to generate a current signal ISP based on a proportional output voltage nVO. The second transconductance circuit 220 is configured to generate a current signal ISN based on an input-related signal xVAC. In one embodiment, the proportional output voltage nVO is generated by sampling an auxiliary winding Na of the transformer 10 of the resonant power converter 600. The proportional output voltage nVO is related to the second output voltage VO. The input-related signal xVAC is related to the peak value of the input voltage VAC (or signal mVAC) of the PFC circuit 500.

In one embodiment, as shown in FIG. 4, the current control circuit 230 is configured to generate a current signal ISO based on the current signals ISP and ISN. In one embodiment, the current signal ISO is positively correlated with the current signal ISP and negatively correlated with the current signal ISN. In one embodiment, the current signal ISO is configured to adjust the first output voltage PVO such that when the second output voltage VO decreases, the first output voltage PVO decreases accordingly, and when the input voltage VAC decreases, the first output voltage PVO also decreases. The relationship between the current signal ISO and the current signals ISP and ISN, and the relationship between the current signal ISO and the first output voltage PVO and the second output voltage VO, will be detailed later.

Figure 5:
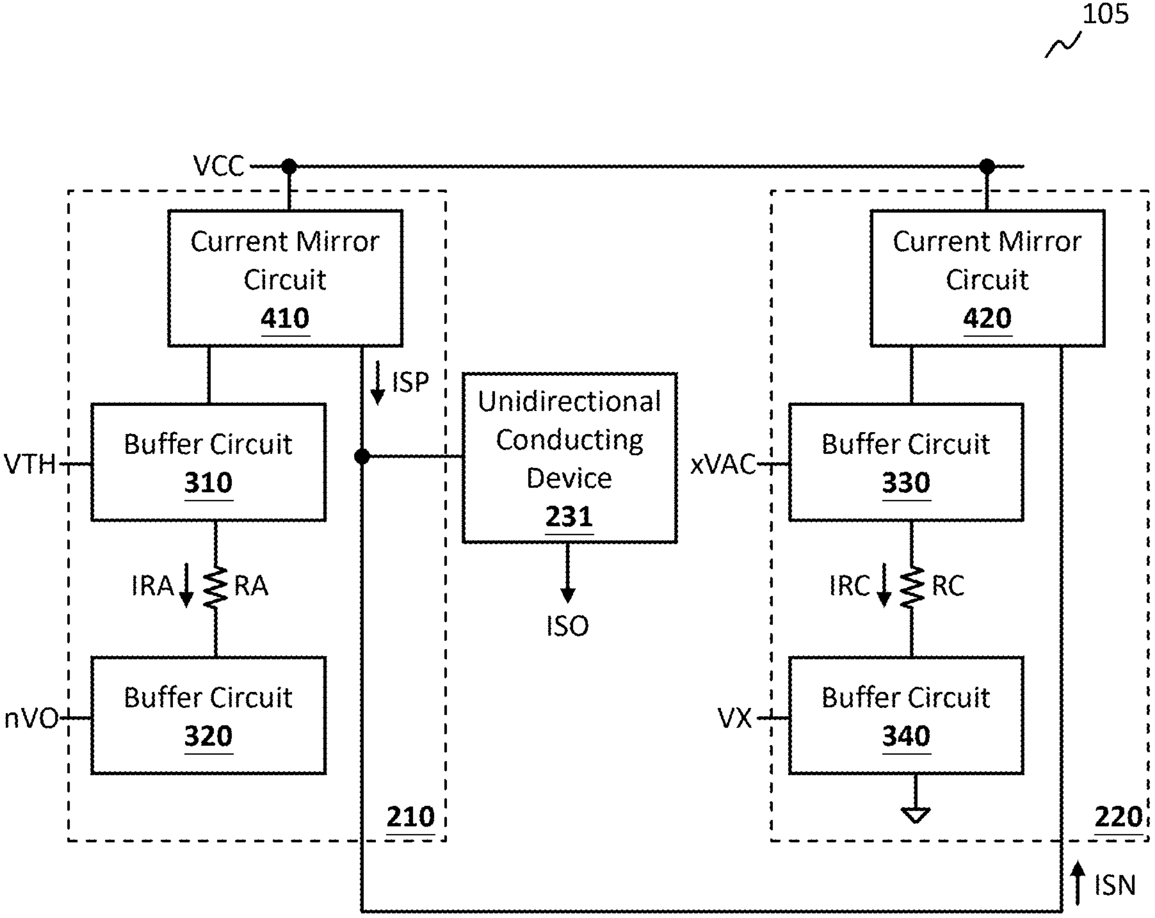
FIG. 5 shows a block diagram of the conversion control circuit in one embodiment of the present invention.

FIG. 5 shows a block diagram of the conversion control circuit in one embodiment of the present invention. In one embodiment, in the conversion control circuit 105, the first transconductance circuit 210 is configured as a first unidirectional voltage-to-current conversion circuit, including buffer circuits 310 and 320, a resistor RA, and at least one current mirror circuit. In this embodiment, the at least one current mirror circuit includes a current mirror circuit 410. In one embodiment, the second transconductance circuit 220 is configured as a second unidirectional voltage-to-current conversion circuit, including buffer circuits 330 and 340, a resistor RC, and at least one current mirror circuit. In this embodiment, the at least one current mirror circuit includes a current mirror circuit 420. In one embodiment, the current control circuit of the conversion control circuit 105 includes a unidirectional conducting device 231, whose forward end is configured to receive the current signals ISP and ISN, to unidirectionally generate the current signal ISO at the reverse end.

In one embodiment, as shown in FIG. 5, the first transconductance circuit 210 is further configured to generate the current signal ISP based on a first threshold VTH and the proportional output voltage nVO. In one embodiment, buffer circuits 310 and 320 are respectively configured to buffer the first threshold VTH and the proportional output voltage nVO. In one embodiment, the resistor RA is coupled between the output terminals of buffer circuits 310 and 320 to unidirectionally generate a transconductance current IRA when the proportional output voltage nVO is less than the first threshold VTH. Thus, the transconductance current IRA is related to the difference between the first threshold VTH and the proportional output voltage nVO. In one embodiment, the current mirror circuit 410 is coupled to buffer circuit 310 and is configured to generate the current signal ISP based on the transconductance current IRA.

In one embodiment, the second transconductance circuit 220 is further configured to generate the current signal ISN based on a second threshold VX and the input-related signal xVAC. In one embodiment, buffer circuits 330 and 340 are respectively configured to buffer the input-related signal xVAC and the second threshold VX. In one embodiment, the resistor RC is coupled between the output terminals of buffer circuits 330 and 340 to unidirectionally generate a transconductance current IRC when the input-related signal xVAC is s greater than the second threshold VX. Thus, the transconductance current IRC is related to the difference between the input-related signal xVAC and the second threshold VX. In one embodiment, the current mirror circuit 420 is coupled to buffer circuit 330 and is configured to generate the current signal ISN based on the transconductance current IRC.

Figure 6:
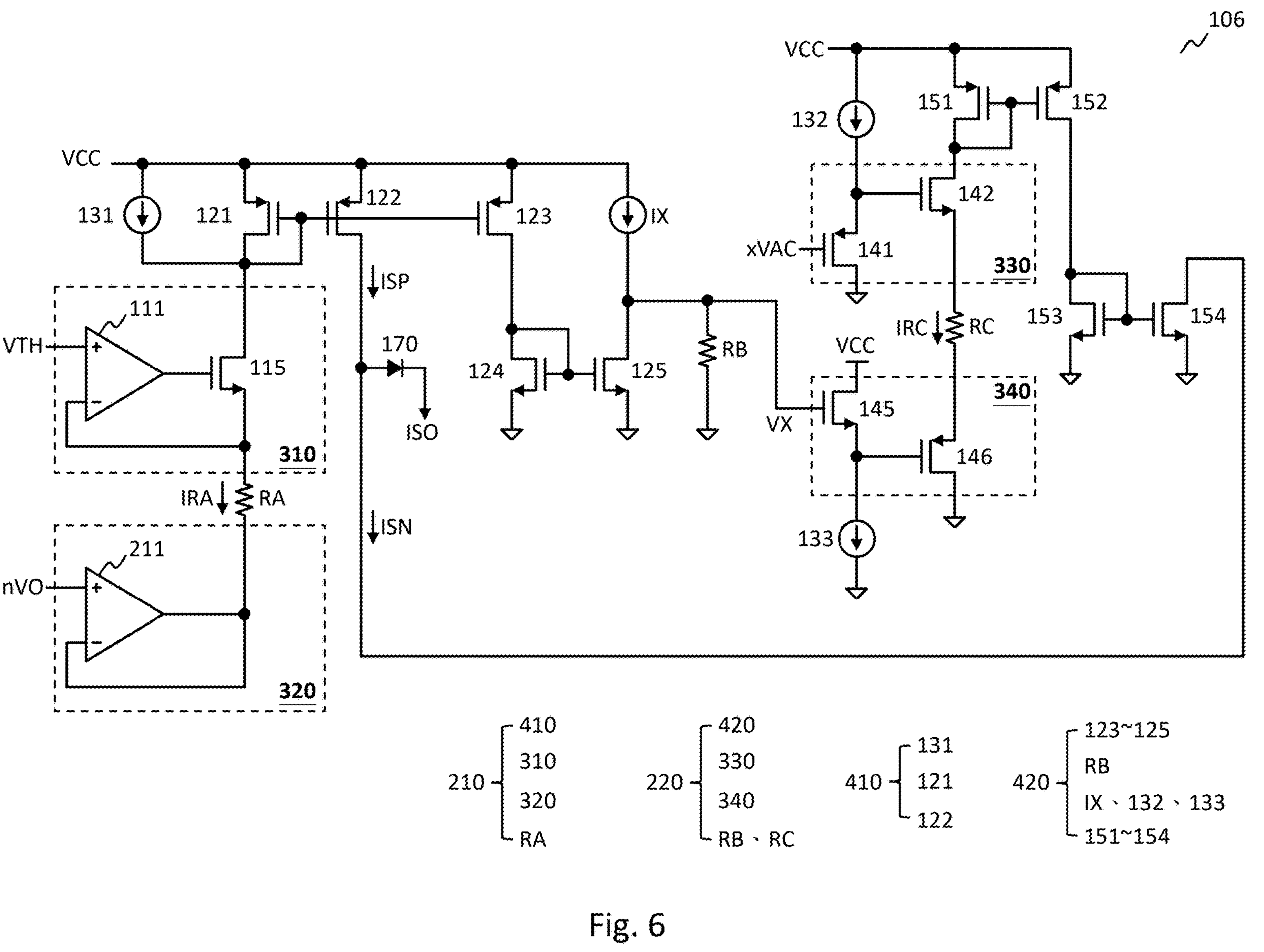
FIG. 6 shows a schematic diagram of the conversion control circuit in a specific embodiment of the present invention.

FIG. 6 shows a schematic diagram of the conversion control circuit in a specific embodiment of the present invention. The conversion control circuit 106 in FIG. 6 is a specific embodiment of the conversion control circuit 105 in FIG. 5. In one embodiment, at least one of the buffer circuits 310 to 340 in FIG. 5 corresponds to the following:

(1) The buffer circuit includes an operational amplifier configured with unit gain; or (2) The buffer circuit includes a first and a second source followers cascaded with each other, wherein the first and the second source followers have opposite and similar level shifts.

In a specific embodiment, as shown in FIG. 6, in the first transconductance circuit 210, buffer circuit 310 includes an operational amplifier 111 and a transistor 115 forming an operational amplifier circuit with unit gain. Buffer circuit 320 includes an operational amplifier 211 configured as an operational amplifier circuit with unit gain. The current mirror circuit 410 includes transistors 121 and 122 for mirroring the transconductance current IRA to generate the current signal ISP. In one embodiment, the current mirror circuit 410 further includes a current source 131 for providing a DC bias current. In the second transconductance circuit 220, buffer circuit 330 includes source followers 141 and 142 cascaded with each other, buffer circuit 340 includes source followers 145 and 146 cascaded with each other, and the current mirror circuit 420 includes transistors 123 to 125 and 151 to 154, a resistor RB, and current sources IX, 132, and 133. In this embodiment, the unidirectional conducting device of the conversion control circuit 106 is employing a diode 170. In this embodiment, the current mirror circuit including transistors 123 to 125 and 151 to 154 is configured to mirror the transconductance current IRC to generate the current signal ISN. Current sources 132 and 133 are configured to bias transistors 141 and 145, respectively.

It should be noted that the above embodiments are not intended to limit the scope of the present invention. For example, in other embodiments, buffer circuit 310 (or buffer circuit 320) can alternatively be configured to include two source followers cascaded with each other. Buffer circuit 330 (or buffer circuit 340) can alternative be configured to include an operational amplifier circuit with unit gain, employing for an operational amplifier and a transistor, or an operational amplifier configured as an operational amplifier circuit with unit gain.

In one embodiment, the programmable second output voltage VO is generated by adjusting the first output voltage PVO of the PFC circuit 500. In one embodiment, when the proportional output voltage nVO is less than the first threshold VTH, the first output voltage PVO of the PFC circuit 500 decreases as the second output voltage VO decreases.

On the other hand, in one embodiment, the second threshold VX corresponds to a voltage level that enables the PFC circuit 500 to operate at an optimal power factor. In this embodiment, as shown in FIG. 6, the second threshold VX is generated based on the current source IX, the current signal ISP, and the resistor RB. The second threshold VX can be expressed by the following Equation (2):

$$\mathrm{V}X = (IX - ISP) * RB \qquad \text{(Eq. 2)}$$

where the current value of the current source IX can be expressed by the following Equation (3) or (4):

$$IX = [(\mathrm{PVO\_MAX} - \mathrm{V}BST) * K0]/RB \qquad \text{(Eq. 3)}$$

$$IX = [\mathrm{V}ref - (\mathrm{V}BST * K0)]/RB \qquad \text{(Eq. 4)}$$

In Eqs. (3) and (4), PVO MAX is the maximum voltage value of the first output voltage PVO, and VBST is a minimum boost value of the PFC circuit 500. Typically, the value of VBST is higher than 20V. The constant K0 is equal to R62/(R61+R62), and Vref is the reference voltage Vref of the error amplifier 301 in the correction control circuit 300 (as shown in FIG. 2).

As shown in FIG. 6, in summary, in this embodiment, when the proportional output voltage nVO is less than the first threshold VTH, the current signal ISP becomes positively correlated with the proportional output voltage nVO, thereby causing the first output voltage PVO to decrease as the second output voltage VO decreases. Only when the input-related signal xVAC is greater than the second threshold VX, does the current signal ISN become positively correlated with the input-related signal xVAC, thereby increasing the lower limit of downward adjustment of the first output voltage PVO based on the current signal ISN when the input-related signal xVAC increases.

In one embodiment, when the proportional output voltage nVO is greater than or equal to the first threshold VTH, adjusting the first output voltage PVO based on the proportional output voltage nVO ceases. In another embodiment, when the input-related signal xVAC is less than or equal to the second threshold VX, adjusting the first output voltage PVO based on the input-related signal xVAC ceases.

Regarding the operational details of the first transconductance circuit 210 and the second transconductance circuit 220 in FIG. 6, those skilled in the art can deduce from the description of FIG. 5. According to the embodiment in FIG. 6, the current signal ISO can be expressed by the following Equation (5):

$$ISO = ISP - ISN \qquad \text{(Eq. 5)}$$

It should be noted that in Equation (5), the current signal ISO is greater than or equal to 0. From Equation (5), it can be seen that the current signal ISN is configured to limit the maximum value of the current signal ISO. Thus, when the input voltage VAC of the PFC circuit 500 increases, the lower limit of downward adjustment of the first output voltage PVO is increased. Assuming all current mirrors have a mirroring ratio of 1, the current signals ISP and ISN can be expressed by the following Equations (6) and (7) respectively:

$$ISP = [(\mathrm{V}TH - n\mathrm{VO})/RA] \qquad \text{(Eq. 6)}$$

$$ISN = [(x\mathrm{VAC} - \mathrm{V}X)/RC] \qquad \text{(Eq. 7)}$$

In Equations (6) and (7), both current signals ISP and ISN are greater than or equal to 0. Specifically, the current signal ISP can only flow unidirectionally out of transistor 122, the current signal ISN can only flow unidirectionally into transistor 154, and the difference between the two (ISP-ISN) can only flow into the forward end of diode 170. From Equations (5) to (7), it can be seen that when the second output voltage VO of the resonant power converter 600 decreases, the first output voltage PVO of the PFC circuit 500 also decreases accordingly. Conversely, when the input voltage VAC of the PFC circuit 500 increases, it will limit the degree of decrease of the first output voltage PVO.

In summary, according to the present invention, the following two objectives can be achieved: (1) By adjusting the first output voltage PVO of the PFC circuit 500 through the current signal ISO, the first output voltage PVO can be adaptively adjusted based on the second output voltage VO of the resonant power converter 600 and not lower than the minimum voltage that the resonant power converter 600 can convert. This ensures the optimization of the programmable second output voltage VO and improves the conversion efficiency of the resonant power converter 600.

(2) By adjusting the first output voltage PVO of the PFC circuit 500 through the current signal ISO, the first output voltage PVO can be adaptively adjusted based on the input voltage VAC of the PFC circuit 500 and not lower than the minimum operating voltage of the PFC circuit. This improves the power factor of the PFC circuit.

Figure 7:
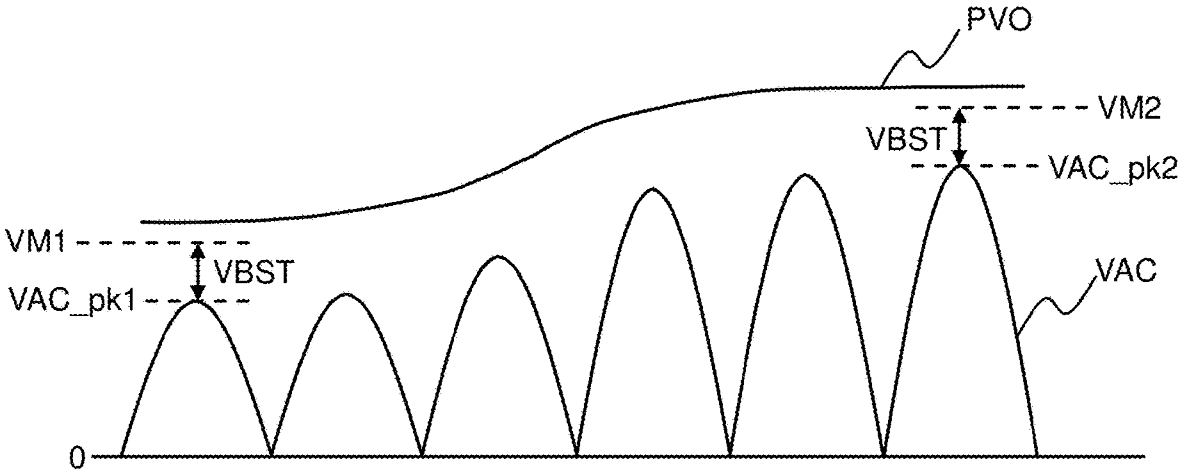
FIG. 7 shows a waveform diagram of the input voltage and output voltage of the PFC circuit in one embodiment of the present invention.

FIG. 7 shows a waveform diagram of the input voltage and output voltage of the PFC circuit in one embodiment of the present invention. In one embodiment, the first output voltage PVO is greater than or equal to a threshold voltage VM, where the threshold voltage VM corresponds to the sum of the peak value VAC_pk of the input voltage VAC and a minimum boost value VBST. For example, as shown in FIG. 7, when the input voltage VAC has a first peak value VAC_pk1, the threshold voltage VM can correspond to VM1, which is the sum of the first peak value VAC_pk1 and the minimum boost value VBST. In this embodiment, at this time, the first output voltage PVO is higher than the threshold voltage VM1. Similarly, when the input voltage VAC has a second peak value VAC_pk2, the threshold voltage VM can correspond to VM2, which is the sum of the second peak value VAC_pk2 and the minimum boost value VBST. In this embodiment, at this time, the first output voltage PVO is higher than the threshold voltage VM2. In one embodiment, only when the first output voltage PVO is greater than or equal to the sum of the peak value of the input voltage VAC and the minimum boost value VBST (i.e., the threshold voltage VM), is the PFC circuit 500 able to operate. In another embodiment, when the first output voltage PVO is greater than or equal to the sum of the peak value of the input voltage VAC and the minimum boost value VBST, the PFC circuit 500 can achieve a better power factor.

In one embodiment, the aforementioned second threshold VX is positively correlated with the threshold voltage VM, and the lower limit of the second threshold VX is related to the proportional output voltage nVO. This ensures the enabling of the PFC circuit 500 and the resonant power converter 600 when the first output voltage PVO is adaptively adjusted with the input-related signal xVAC based on the current signal ISN.

In one embodiment, the relationship between the input-related signal xVAC and the peak value VAC_pk of the input voltage VAC can be expressed by the following Equation (8):

$$x\text{VAC} = \text{VAC\_pk} * K1 \qquad \text{(Eq. 8)}$$

Wherein the constant K1 may be set to be equal to the constant K0, i.e., R62/(R61+R62).

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in t this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be configured together, or, a portion of one embodiment can be configured to replace a corresponding part of another embodiment. In view of the foregoing, the spirit of the present invention should cover all such and other modifications and variations, which should be interpreted to fall within the scope of the following claims and their equivalents.

What is claimed is:

1. A conversion control circuit, configured to control a resonant power converter and configured to adjust a first output voltage generated by a power factor correction (PFC) circuit, wherein the resonant power converter generates a second output voltage based on the first output voltage, the second output voltage being programmable, and the first output voltage being adaptively adjustable, the conversion control circuit comprising:

- a first transconductance circuit, configured to generate a first current signal based on a proportional output voltage related to the second output voltage;
- a second transconductance circuit, configured to generate a second current signal based on an input-related signal, wherein the input-related signal is related to a peak value of an input voltage of the PFC circuit; and
- a current control circuit, configured to generate a third current signal based on the first current signal and the second current signal;
- wherein the third current signal is positively correlated with the first current signal and negatively correlated with the second current signal;
- wherein the third current signal is configured to adjust the first output voltage such that when the second output voltage decreases, the first output voltage decreases accordingly, and when the input voltage decreases, the first output voltage also decreases.

2. The conversion control circuit of claim 1, wherein the second current signal is configured to limit a maximum value of the third current signal, thereby increasing a lower limit of downward adjustment of the first output voltage when the input voltage of the PFC circuit increases.

3. The conversion control circuit of claim 2, wherein the first transconductance circuit is further configured to generate the first current signal based on a first threshold and the proportional output voltage;

- wherein the second transconductance circuit is further configured to generate the second current signal based on a second threshold and the input-related signal.

4. The conversion control circuit of claim 3, wherein when the proportional output voltage is greater than or equal to the first threshold, adjusting the first output voltage based on the proportional output voltage ceases; or when the input-related signal is less than or equal to the second threshold, adjusting the first output voltage based on the input-related signal ceases.

5. The conversion control circuit of claim 3, wherein when the proportional output voltage is less than the first threshold, the first current signal becomes positively correlated with the proportional output voltage, thereby causing the first output voltage to decrease as the second output voltage decreases; and when the input-related signal is greater than the second threshold, the second current signal becomes positively correlated with the input-related signal, thereby increasing the lower limit of downward adjustment of the first output voltage based on the second current signal when the input-related signal increases.

6. The conversion control circuit of claim 5, wherein the second threshold corresponds to a voltage level that enables the PFC circuit to operate at an optimal power factor.

7. The conversion control circuit of claim 6, wherein only when the first output voltage is greater than or equal to a threshold voltage, be the PFC circuit able to operate, wherein the threshold voltage corresponding to the peak value of the input voltage plus a minimum boost value.

8. The conversion control circuit of claim 7, wherein the second threshold is positively correlated with the threshold voltage, and a lower limit of the second threshold is related to the proportional output voltage, thereby ensuring the enabling of the PFC circuit and the resonant power converter when the first output voltage is adaptively adjusted with the input-related signal based on the second current signal.

9. The conversion control circuit of claim 5, wherein the first transconductance circuit is configured as a first unidirectional voltage-to-current conversion circuit, including:

a first and a second buffer circuits, respectively configured to buffer the first threshold and the proportional output voltage;

a first resistor, coupled between output terminals of the first and the second buffer circuits, to unidirectionally generate a first transconductance current when the proportional output voltage is less than the first threshold, wherein the first transconductance current is related to a difference between the first threshold and the proportional output voltage; and at least one first current mirror circuit, coupled to the first buffer circuit, configured to generate the first current signal based on the first transconductance current; and/or wherein the second transconductance circuit is configured as a second unidirectional voltage-to-current conversion circuit, including:

a third and a fourth buffer circuits, respectively configured to buffer the input-related signal and the second threshold;

a second resistor, coupled between output terminals of the third and the fourth buffer circuits, to unidirectionally generate a second transconductance current when the input-related signal is greater than the second threshold, wherein the second transconductance current is related to a difference between the input-related signal and the second threshold; and at least one second current mirror circuit, coupled to the third buffer circuit, configured to generate the second current signal based on the second transconductance current.

10. The conversion control circuit of claim 9, wherein the current control circuit includes a unidirectional conducting device, with its forward end configured to receive the first current signal and the second current signal, to unidirectionally generate the third current signal at its reverse end.

11. The conversion control circuit of claim 9, wherein at least one of the first to the fourth buffer circuits corresponds to one of the following:

the buffer circuit includes an operational amplifier configured with unit gain; or the buffer circuit includes a first and a second source followers cascaded with each other, wherein the first and the second source followers have opposite and similar level shifts.

12. The conversion control circuit of claim 1, wherein the proportional output voltage is generated by sampling an auxiliary winding of a transformer of the resonant power converter.

13. The conversion control circuit of claim 1, wherein the third current signal is coupled to a feedback voltage divider of the PFC circuit, thereby adjusting the first output voltage.

14. A control method for controlling a resonant power converter and for adjusting a first output voltage generated by a power factor correction (PFC) circuit, wherein the resonant power converter generates a second output voltage based on the first output voltage, the second output voltage being programmable, and the first output voltage being adaptively adjustable, the control method comprising:

generating a first current signal based on a proportional output voltage related to the second output voltage;

generating a second current signal based on an input-related signal, wherein the input-related signal is related to a peak value of an input voltage of the PFC circuit;

generating a third current signal based on the first current signal and the second current signal; and adjusting the first output voltage based on the third current signal, such that when the second output voltage decreases, the first output voltage decreases accordingly, and when the input voltage decreases, the first output voltage also decreases;

wherein the third current signal is positively correlated with the first current signal and negatively correlated with the second current signal.

15. The control method of claim 14, wherein the second current signal is configured to limit a maximum value of the third current signal, thereby increasing a lower limit of downward adjustment of the first output voltage when the input voltage of the PFC circuit increases.

16. The control method of claim 15, wherein the step of generating the first current signal further includes:

generating the first current signal based on a first threshold and the proportional output voltage;

wherein the step of generating the second current signal further includes:

generating the second current signal based on a second threshold and the input-related signal.

17. The control method of claim 16, wherein when the proportional output voltage is greater than or equal to the first threshold, adjusting the first output voltage based on the proportional output voltage ceases; or when the input-related signal is less than or equal to the second threshold, adjusting the first output voltage based on the input-related signal ceases.

18. The control method of claim 16, wherein the step of generating the first current signal further includes:

when the proportional output voltage is less than the first threshold, controlling the first current signal to be positively correlated with the proportional output voltage, thereby causing the first output voltage to decrease as the second output voltage decreases;

wherein the step of generating the second current signal further includes:

when the input-related signal is greater than the second threshold, controlling the second current signal to be positively correlated with the input-related signal, thereby increasing the lower limit of downward adjustment of the first output voltage based on the second current signal when the input-related signal increases.

19. The control method of claim 18, wherein the second threshold corresponds to a voltage level that enables the PFC circuit to operate at an optimal power factor.

20. The control method of claim 19, further comprising: enabling the PFC circuit to operate when the first output voltage is greater than or equal to a threshold voltage, wherein the threshold voltage corresponds to the peak value of the input voltage plus a minimum boost value.

21. The control method of claim 20, wherein the second threshold is positively correlated with the threshold voltage, and a lower limit of the second threshold is related to the proportional output voltage, thereby ensuring the enabling of the PFC circuit and the resonant power converter when the first output voltage is adaptively adjusted with the input-related signal based on the second current signal.

22. The control method of claim 18, wherein the step of generating the first current signal further includes:

buffering the first threshold and the proportional output voltage;

unidirectionally generating a first transconductance current when the proportional output voltage is less than the first threshold, wherein the first transconductance current is related to a difference between the first threshold and the proportional output voltage; and generating the first current signal based on the first transconductance current; and/or the step of generating the second current signal further includes:

buffering the input-related signal and the second threshold;

unidirectionally generating a second transconductance current when the input-related signal is greater than the second threshold, wherein the second transconductance current is related to a difference between the input-related signal and the second threshold; and generating the second current signal based on the second transconductance current.

23. The control method of claim 14, wherein the proportional output voltage is generated by sampling an auxiliary winding of a transformer of the resonant power converter.

* * * * *